Dec. 10, 1929.  F. L. SEELEY  1,739,423
SHIPPING BLOCK FOR AUTOMOBILE TIRES AND RIMS
Filed April 10, 1929
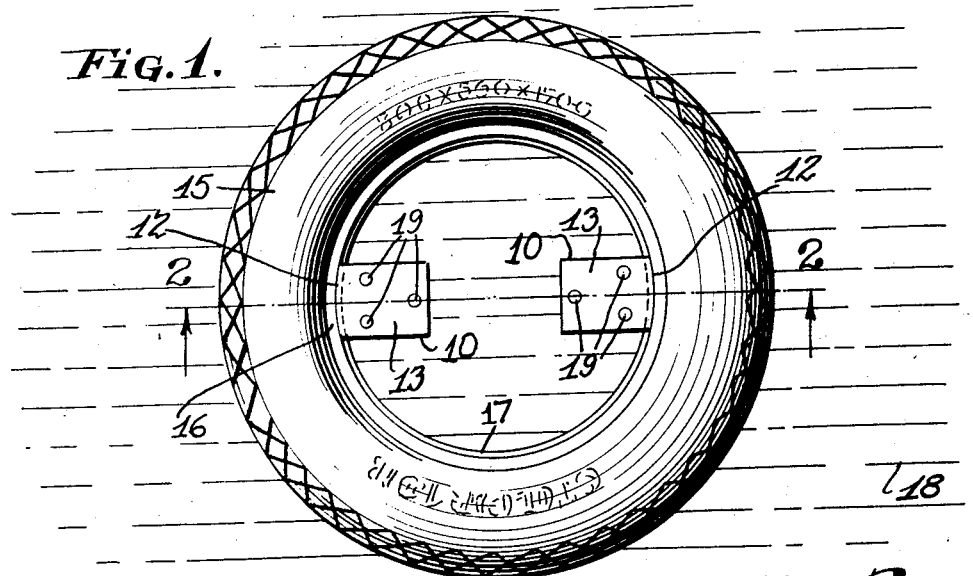
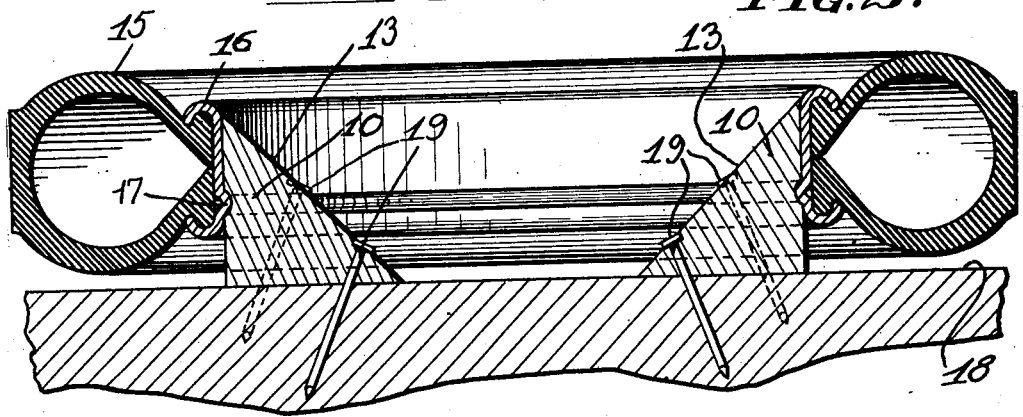
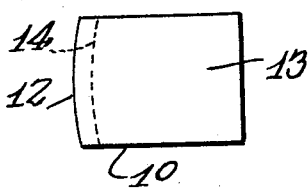
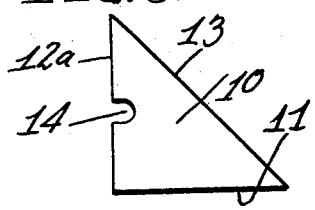
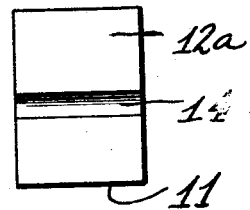
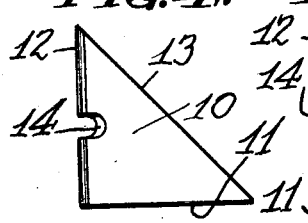
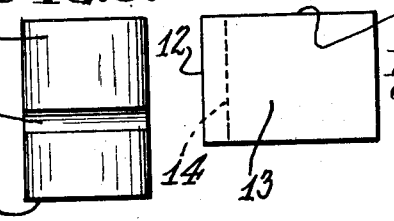
INVENTOR.
Fay L. Seeley.
by
J. L. Bryant
ATTORNEY.

Patented Dec. 10, 1929

1,739,423

UNITED STATES PATENT OFFICE

FAY L. SEELEY, OF DETROIT, MICHIGAN, ASSIGNOR TO THE EVANS AUTO LOADING CO. INC., OF DETROIT, MICHIGAN

SHIPPING BLOCK FOR AUTOMOBILE TIRES AND RIMS

Application filed April 10, 1929. Serial No. 354,045.

In the shipping of automobiles, in railroad cars, it is frequently necessary to remove the spare tire and rim from the automobile to provide sufficient clearance and for conserving space, and it has been the general practice either to fasten the spare tire mounted on the rim on the floor of a car or the wall, but such practice results in the rubbing or chafing of the side wall of the tire and otherwise injuring the same. It is therefore the primary object of this invention to so mount an assembled tire and rim that the side wall of the tire adjacent the floor or wall of the tire is spaced therefrom and is rigidly supported in such position so that all injury to the tire is eliminated.

With the above and other objects that will become apparent as the nature of the invention is better understood, the same consists in the novel form, combination and arrangement of parts hereinafter more fully described, shown in the accompanying drawing and claimed.

In the drawing:—

Figure 1 is a side elevational view of an assembled tire and rim anchored in position either upon a railroad car floor or side wall by anchoring blocks that hold the tire spaced from the floor or wall;

Figure 2 is a cross-sectional view taken on line 2—2 of Figure 1 showing the tire spaced from the floor or wall;

Figure 3 is a top plan view of one of the anchoring blocks showing the rim engaging face thereof curved coincident to the curvature of the wheel rim;

Figure 4 is a side elevational view of the block shown in Figure 1, showing the horizontal groove in the forward curved face of the block;

Figure 5 is a front elevational view of the block shown in Figures 3 and 4; and

Figures 6, 7 and 8 show another form of wheel rim engaging block in which the front face thereof extends in a straight line.

While the block for supporting the assembled tire and rim in spaced relation to a railroad car floor or wall may be of any desired configuration, the same is herein for purposes of illustration and as presenting one form thereof, shown to be of triangular formation in side elevation, the block 10 having a flat bottom face 11, a front horizontally curved face 12 and an upper inclined face 13. The front horizontally curved face 12 is provided with a horizontal groove 14 extending from side to side of the block at a point suitably spaced upwardly from the bottom face 11.

The tire 15 is mounted upon a rim 16, the inner face of the rim 16 being provided with an inwardly annular bead 17 that is employed in correctly positioning the rim 16 upon a wheel felly.

In the mounting of the assembled tire and rim for shipment upon a railroad car floor or wall 18, as shown in Figures 1 and 2, the bead 17 upon the rim 16 is placed in the groove 14 of the block 10, the latter being nailed or otherwise anchored as at 19 to the car floor or wall. When one block has been so disposed, the opposite side of the assembled tire and rim may be elevated to receive a cooperating anchoring block which is similarly associated with the rim 16, and any number of retaining blocks may be employed. The interlocking connection between the rim bead 17 and groove 14 of the block 10 holds the assembled tire and rim rigidly mounted and all movement thereof relative to the car floor or wall 18 is eliminated. Also, the tire 15 is maintained in spaced relation with respect to the floor or wall so that injury to the tire as by chafing during transit is eliminated. The block 10 may be of any desired design, that is, other than triangular in side elevation and it is not intended to limit the invention to the nature of material employed in the block, as the same may be of wood or composite material.

In the form of block shown in Figures 6 to 8, the forward face 12$^a$ thereof provided with a groove 14 is formed on a straight line as distinguished from the curved face 12 of the block 10 in Figures 3 to 5, but in all other respects, the block shown in Figs. 6 to 8 is of similar construction.

While there are herein shown and described the preferred embodiments of the present invention, it is nevertheless to be understood that minor changes may be made therein without departing from the spirit and scope of the invention as claimed.

I claim:—

1. Means for supporting an assembled tire and rim in spaced relation to and parallel with a support including the wall or floor of a car comprising in combination with a rim, a plurality of independent supporting blocks engaged with the rim and anchored to the support with the side of the tire spaced from the support.

2. Means for supporting an assembled tire and rim in spaced relation to and parallel with a support including the wall or floor of a car comprising in combination with a rim having an annular bead upon its inner side, a plurality of independent supporting blocks anchored to the support and grooved to receive the rim bead with the tire spaced from the support.

3. Means for supporting an assembled tire and rim in spaced relation to and parallel with a support including the wall or floor of a car comprising in combination with a rim having an annular bead upon its inner side, a plurality of independent supporting blocks anchored to the support and grooved to receive the rim bead with the tire spaced from the support, the rim engaging face of the block being curved incident to the curvature of the wheel rim.

4. Means for supporting an assembled tire and rim in spaced relation to and parallel with a support including the wall or floor of a car comprising in combination with a rim having an annular bead upon its inner surface adjacent one side, a plurality of independent supporting blocks for the rim anchored to the support, said blocks, each having a vertical side facing the rim and a horizontal groove receiving the rim bead with the tire spaced from the support.

In testimony whereof I affix my signature.

FAY L. SEELEY.